United States Patent
Ritter et al.

(10) Patent No.: US 11,830,672 B2
(45) Date of Patent: Nov. 28, 2023

(54) ULTRACAPACITOR FOR USE IN A SOLDER REFLOW PROCESS

(71) Applicant: KYOCERA AVX Components Corporation, Fountain Inn, SC (US)

(72) Inventors: Andrew P. Ritter, Simpsonville, SC (US); Jonathan Robert Knopsnyder, Fountain Inn, SC (US); Shawn Hansen, Simpsonville, SC (US)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 0 days.

(21) Appl. No.: 15/810,498

(22) Filed: Nov. 13, 2017

(65) Prior Publication Data

US 2018/0144878 A1    May 24, 2018

Related U.S. Application Data

(60) Provisional application No. 62/425,636, filed on Nov. 23, 2016.

(51) Int. Cl.
*H01G 11/82* (2013.01)
*H01G 11/84* (2013.01)
(Continued)

(52) U.S. Cl.
CPC .............. *H01G 11/82* (2013.01); *H01G 11/28* (2013.01); *H01G 11/70* (2013.01); *H01G 11/74* (2013.01);
(Continued)

(58) Field of Classification Search
CPC ......... H01G 11/10; H01G 11/78; H01G 11/82
See application file for complete search history.

(56) References Cited

U.S. PATENT DOCUMENTS

| 5,558,679 A | 9/1996 | Tuttle |
| 5,781,403 A | 7/1998 | Aoki et al. |

(Continued)

FOREIGN PATENT DOCUMENTS

| CA | 2430263 A1 * | 5/2002 | ............ H01M 4/133 |
| CN | 1833047 | 9/2006 | |

(Continued)

OTHER PUBLICATIONS

EP Extended Search Report and Opinion for European Application No. 17874206.0 dated Sep. 18, 2020, 14 pages.

(Continued)

*Primary Examiner* — Eric W Thomas
(74) *Attorney, Agent, or Firm* — Dority & Manning, P.A.

(57) ABSTRACT

An ultracapacitor that is capable of exhibiting good properties even after being subjected to high temperatures, such as experienced during solder reflow, is provided. The ultracapacitor contains a housing having sidewalls that extend in a direction generally perpendicular to a base. An interior cavity is defined between an inner surface of the base and the sidewalls within which an electrode assembly can be positioned. To attach the electrode assembly, first and second conductive members are disposed on the inner surface of the base. The electrode assembly likewise contains first and second leads that extend outwardly therefrom and are electrically connected to the first and second conductive members, respectively. The first and second conductive members are, in turn, electrically connected to first and second external terminations, respectively, which are provided on an outer surface of the base.

29 Claims, 4 Drawing Sheets

(51) Int. Cl.
  *H01G 11/70* (2013.01)
  *H01G 11/74* (2013.01)
  *H01G 11/28* (2013.01)
  *H01G 11/32* (2013.01)
  *H01G 11/62* (2013.01)
  *H01G 11/60* (2013.01)
  *H01G 11/24* (2013.01)

(52) U.S. Cl.
  CPC ............. *H01G 11/84* (2013.01); *H01G 11/24* (2013.01); *H01G 11/32* (2013.01); *H01G 11/60* (2013.01); *H01G 11/62* (2013.01); *Y02E 60/13* (2013.01)

(56) References Cited

U.S. PATENT DOCUMENTS

| | | |
|---|---|---|
| 5,783,464 A | 7/1998 | Burns |
| 5,959,830 A | 9/1999 | Inagawa et al. |
| 6,021,039 A | 2/2000 | Inagawa et al. |
| 6,031,712 A | 2/2000 | Kurihara et al. |
| 6,043,183 A * | 3/2000 | Alford ................. H01G 9/155 361/502 |
| 6,046,903 A | 4/2000 | Inagawa et al. |
| 6,064,560 A | 5/2000 | Hirahara et al. |
| 6,064,561 A | 5/2000 | Harada et al. |
| 6,097,587 A | 8/2000 | Inagawa et al. |
| 6,198,621 B1 | 3/2001 | Saito et al. |
| 6,219,221 B1 | 4/2001 | Kibi et al. |
| 6,267,823 B1 * | 7/2001 | Yamaguchi .......... B23K 35/262 148/24 |
| 6,288,888 B1 | 9/2001 | Sakata et al. |
| 6,320,740 B1 | 11/2001 | Saito et al. |
| 6,320,741 B1 | 11/2001 | Ohya et al. |
| 6,324,049 B1 | 11/2001 | Inagawa et al. |
| 6,339,529 B1 | 1/2002 | Kasahara et al. |
| 6,341,058 B1 | 1/2002 | Sakata et al. |
| 6,377,441 B1 | 4/2002 | Ohya et al. |
| 6,392,868 B2 | 5/2002 | Ohya et al. |
| 6,426,865 B2 | 7/2002 | Kasahara et al. |
| 6,445,556 B1 | 9/2002 | Watanabe et al. |
| 6,445,566 B2 | 9/2002 | Watanabe |
| 6,507,479 B2 | 1/2003 | Saito et al. |
| 6,532,144 B2 | 3/2003 | Ohya et al. |
| 6,625,007 B2 | 9/2003 | Sakata et al. |
| 6,636,417 B2 | 10/2003 | Sakata et al. |
| 6,653,018 B2 | 11/2003 | Takahashi et al. |
| 6,657,850 B2 | 12/2003 | Nakazawa et al. |
| 6,669,860 B1 | 12/2003 | Maruyama et al. |
| 6,671,165 B1 | 12/2003 | Nakazawa et al. |
| 6,717,795 B2 | 4/2004 | Nakazawa et al. |
| 6,733,544 B2 | 5/2004 | Takasugi et al. |
| 6,741,450 B2 | 5/2004 | Nakazawa et al. |
| 6,751,084 B2 | 6/2004 | Nakazawa et al. |
| 6,843,810 B2 | 1/2005 | Nakazawa et al. |
| 6,869,731 B2 | 3/2005 | Nobuta et al. |
| 6,870,725 B2 | 3/2005 | Sakata et al. |
| 6,875,541 B2 | 4/2005 | Mitani et al. |
| 6,912,116 B2 | 6/2005 | Takahashi et al. |
| 6,995,970 B2 | 2/2006 | Katai et al. |
| 6,998,190 B2 | 2/2006 | Nobuta et al. |
| 7,016,178 B2 | 3/2006 | Erhardt et al. |
| 7,038,905 B2 | 5/2006 | Yoshihara et al. |
| 7,046,503 B2 | 5/2006 | Hinoki et al. |
| 7,074,688 B2 | 7/2006 | Kurihara et al. |
| 7,082,027 B2 | 7/2006 | Nobuta et al. |
| 7,092,239 B2 | 8/2006 | Nakazawa et al. |
| 7,169,506 B2 | 1/2007 | Watanabe et al. |
| 7,169,509 B2 | 1/2007 | Nobuta et al. |
| 7,173,806 B2 | 2/2007 | Hinoki et al. |
| 7,177,139 B2 | 2/2007 | Oizumi |
| 7,209,341 B2 | 4/2007 | Yoshitake et al. |
| 7,230,069 B2 | 6/2007 | Nobuta et al. |
| 7,236,349 B2 | 6/2007 | Miyaki et al. |
| 7,251,122 B2 | 7/2007 | Hinoki et al. |
| 7,256,099 B2 | 8/2007 | Takahashi et al. |
| 7,256,981 B2 | 8/2007 | Kosuda et al. |
| 7,303,974 B2 | 12/2007 | Hinoki et al. |
| 7,303,975 B2 | 12/2007 | Hinoki et al. |
| 7,307,831 B2 | 12/2007 | Tanaka et al. |
| 7,309,544 B2 | 12/2007 | Nobuta et al. |
| 7,310,219 B2 | 12/2007 | Kosuda et al. |
| 7,311,995 B2 | 12/2007 | Nakamura et al. |
| 7,326,491 B2 | 2/2008 | Takahashi et al. |
| 7,368,202 B2 | 5/2008 | Kurihara et al. |
| 7,403,371 B2 | 7/2008 | Miyaki et al. |
| 7,405,922 B2 | 7/2008 | Kawaguchi et al. |
| 7,440,257 B2 | 10/2008 | Kirchner et al. |
| 7,468,222 B2 | 12/2008 | Takahashi et al. |
| 7,489,497 B2 | 2/2009 | Sakamoto et al. |
| 7,492,573 B2 | 2/2009 | Takahashi et al. |
| 7,503,942 B2 | 3/2009 | Kurihara et al. |
| 7,541,111 B2 | 6/2009 | Itoh et al. |
| 7,580,244 B2 | 8/2009 | Sakamoto et al. |
| 7,623,339 B2 | 11/2009 | Takahashi et al. |
| 7,631,416 B2 | 12/2009 | Ohta et al. |
| 7,632,608 B2 | 12/2009 | Yamaguchi et al. |
| 7,662,424 B2 | 2/2010 | Kurihara et al. |
| 7,691,533 B2 | 4/2010 | Sana et al. |
| 7,704,635 B2 | 4/2010 | Kosuda et al. |
| 7,708,787 B2 | 5/2010 | Hinoki et al. |
| 7,749,649 B2 | 7/2010 | Watanabe et al. |
| 7,754,382 B2 | 7/2010 | Kurihara et al. |
| 7,785,738 B2 | 8/2010 | Ohashi et al. |
| 7,820,337 B2 | 10/2010 | Naoi et al. |
| 7,830,646 B2 | 11/2010 | Eilertsen |
| 7,855,013 B2 | 12/2010 | Ohashi et al. |
| 7,867,550 B2 | 1/2011 | Suzuki et al. |
| 7,883,796 B2 | 2/2011 | Kida et al. |
| 7,933,133 B2 | 4/2011 | Motoki et al. |
| 7,935,380 B2 | 5/2011 | Hinoki et al. |
| 8,088,515 B2 | 1/2012 | Ogawa et al. |
| 8,133,605 B2 | 3/2012 | Murata |
| 8,142,750 B2 | 3/2012 | Sano et al. |
| 8,163,332 B2 | 4/2012 | Emoto et al. |
| 8,247,100 B2 | 8/2012 | Naoi et al. |
| 8,248,756 B2 | 8/2012 | Higawara et al. |
| 8,263,256 B2 | 9/2012 | Hatta et al. |
| 8,264,818 B2 | 9/2012 | Tamachi et al. |
| 8,273,482 B2 | 9/2012 | Naoi et al. |
| 8,287,773 B2 | 10/2012 | Suzuki |
| 8,293,409 B2 | 10/2012 | Suzuki |
| 8,310,812 B2 | 11/2012 | Ashizaki et al. |
| 8,329,326 B2 | 12/2012 | Suto |
| 8,334,009 B2 | 12/2012 | Emoto et al. |
| 8,343,377 B2 | 1/2013 | Suzuki |
| 8,343,669 B2 | 1/2013 | Naoi et al. |
| 8,366,968 B2 | 2/2013 | Suzuki et al. |
| 8,409,751 B2 | 4/2013 | Suto |
| 8,435,669 B2 | 5/2013 | Tsukamoto et al. |
| 8,445,144 B2 | 5/2013 | Utsugi et al. |
| 8,449,980 B2 | 5/2013 | Suzuki et al. |
| 8,455,136 B2 | 6/2013 | Ishida et al. |
| 8,470,473 B2 | 6/2013 | Katai et al. |
| 8,481,198 B2 | 7/2013 | Ohashi et al. |
| 8,486,561 B2 | 7/2013 | Tsukamoto et al. |
| 8,492,031 B2 | 7/2013 | Suzuki et al. |
| 8,524,396 B2 | 9/2013 | Sano |
| 8,536,465 B2 | 9/2013 | Hagiwara et al. |
| 8,553,392 B2 | 10/2013 | Tamachi et al. |
| 8,557,437 B2 | 10/2013 | Hinoki et al. |
| 8,563,166 B2 | 10/2013 | Onodera et al. |
| 8,586,182 B2 | 11/2013 | Suzuki et al. |
| 8,603,667 B1 | 12/2013 | Mano et al. |
| 8,614,020 B2 | 12/2013 | Konda et al. |
| 8,617,740 B2 | 12/2013 | Onodera et al. |
| 8,617,744 B2 | 12/2013 | Nakahara et al. |
| 8,619,409 B2 | 12/2013 | Yawata et al. |
| 8,631,549 B2 | 1/2014 | Motoki et al. |
| 8,652,682 B2 | 2/2014 | Ihara et al. |
| 8,663,870 B2 | 3/2014 | Fukushima et al. |
| 8,681,478 B2 | 3/2014 | Hagiwara |
| 8,693,168 B1 | 4/2014 | Hagiwara et al. |
| 8,705,225 B2 | 4/2014 | Ohashi et al. |

(56) References Cited

U.S. PATENT DOCUMENTS

| | | | |
|---|---|---|---|
| 8,715,854 B2 | 5/2014 | Suzuki et al. |
| 8,722,232 B2 | 5/2014 | Hagiwara et al. |
| 8,728,344 B2 | 5/2014 | Katsu et al. |
| 8,734,987 B2 | 5/2014 | Sano et al. |
| 8,760,840 B2 | 6/2014 | Hasegawa et al. |
| 8,760,851 B2 | 6/2014 | Signorelli et al. |
| 8,765,277 B2 | 7/2014 | Yawata et al. |
| 8,765,286 B2 | 7/2014 | Hagiwara et al. |
| 8,785,045 B2 | 7/2014 | Suzuki |
| 8,797,716 B2 | 8/2014 | Tamachi et al. |
| 8,802,268 B2 | 8/2014 | Hagiwara et al. |
| 8,804,310 B2 | 8/2014 | Terui et al. |
| 8,821,763 B2 | 9/2014 | Sano et al. |
| 8,871,383 B2 | 10/2014 | Hatta et al. |
| 8,902,594 B2 | 12/2014 | Goto et al. |
| 8,916,289 B2 | 12/2014 | Watanabe et al. |
| 8,932,750 B2 | 1/2015 | Signorelli et al. |
| 8,932,762 B2 | 1/2015 | Sano et al. |
| 8,936,871 B2 | 1/2015 | Sano et al. |
| 8,953,302 B2 | 2/2015 | Hagiwara |
| 8,964,357 B2 | 2/2015 | Tamachi et al. |
| 8,976,508 B2 | 3/2015 | Tamachi et al. |
| 8,993,171 B2 | 3/2015 | Sano et al. |
| 9,001,495 B2 | 4/2015 | Brambilla et al. |
| 9,013,144 B2 | 4/2015 | Cooley et al. |
| 9,017,634 B2 | 4/2015 | Brambilla et al. |
| 9,023,510 B2 | 5/2015 | Goto et al. |
| 9,034,512 B2 | 5/2015 | Sato et al. |
| 9,039,939 B2 | 5/2015 | Sano |
| 9,048,030 B2 | 6/2015 | Hasegawa et al. |
| 9,064,623 B2 | 6/2015 | Shirakawa et al. |
| 9,083,013 B2 | 7/2015 | Itoh et al. |
| 9,112,206 B2 | 8/2015 | Murata et al. |
| 9,142,357 B2 | 9/2015 | Matsumoto |
| 9,153,815 B2 | 10/2015 | Motohashi et al. |
| 9,178,186 B2 | 11/2015 | Hatta et al. |
| 9,190,216 B2 | 11/2015 | Suto et al. |
| 9,190,221 B2 | 11/2015 | Kokotov et al. |
| 9,206,672 B2 | 12/2015 | Cooley et al. |
| 9,209,434 B2 | 12/2015 | Epstein |
| 9,209,498 B2 | 12/2015 | Murata |
| 9,214,661 B2 | 12/2015 | Naoi et al. |
| 9,218,917 B2 | 12/2015 | Brambilla et al. |
| 9,236,632 B2 | 1/2016 | Ohashi et al. |
| 9,263,191 B2 | 2/2016 | Shirakawa et al. |
| 9,263,198 B2 | 2/2016 | Harada et al. |
| 9,281,133 B2 | 3/2016 | Nagase et al. |
| 9,305,717 B2 | 4/2016 | Hagiwara |
| 9,318,275 B2 | 4/2016 | Hagiwara et al. |
| 9,368,293 B2 | 6/2016 | Yoshikawa et al. |
| 9,368,776 B2 | 6/2016 | Horikawa et al. |
| 9,397,322 B2 | 6/2016 | Hatta et al. |
| 9,406,448 B2 | 8/2016 | Nagase et al. |
| 9,412,995 B2 | 8/2016 | Ogawa et al. |
| 9,514,893 B2 | 12/2016 | Itaya et al. |
| 9,515,499 B2 | 12/2016 | Signorelli et al. |
| 9,541,516 B2 | 1/2017 | Nakayama et al. |
| 9,558,893 B2 | 1/2017 | Horikawa et al. |
| 9,558,894 B2 | 1/2017 | Kuttipillai et al. |
| 9,575,025 B2 | 2/2017 | Nakayama et al. |
| 9,601,808 B2 | 3/2017 | Kotani et al. |
| 9,620,300 B2 | 4/2017 | Saya |
| 9,659,713 B2 | 5/2017 | Shirakawa et al. |
| 9,683,441 B2 | 6/2017 | Signorelli et al. |
| 9,705,110 B2 | 7/2017 | Hatta et al. |
| 9,728,343 B2 | 8/2017 | Horikawa et al. |
| 9,748,046 B2 | 8/2017 | Ueda et al. |
| 9,755,204 B2 | 9/2017 | Shimura et al. |
| 9,761,381 B2 | 9/2017 | Omodera |
| 9,779,886 B2 | 10/2017 | Harada et al. |
| 9,793,062 B2 | 10/2017 | Itaya et al. |
| 9,831,480 B2 | 11/2017 | Naoi et al. |
| 9,871,232 B2 | 1/2018 | Hatta et al. |
| 9,911,547 B2 | 3/2018 | Horikawa |
| 9,954,382 B2 | 4/2018 | Cooley et al. |
| 9,966,604 B2 | 5/2018 | Kondo et al. |
| 10,005,150 B2 | 6/2018 | Kanryo et al. |
| 10,079,117 B2 | 9/2018 | Horiguchi et al. |
| 10,115,535 B2 | 10/2018 | Tsuzuki et al. |
| 10,134,532 B2 | 11/2018 | Horikawa et al. |
| 10,163,570 B2 | 12/2018 | Aoki et al. |
| 10,163,581 B2 | 12/2018 | Aoki et al. |
| 10,600,582 B1 | 3/2020 | Brambilla et al. |
| 10,673,264 B2 | 6/2020 | Cooley et al. |
| 10,830,034 B2 | 11/2020 | Cooley et al. |
| 10,872,737 B2 | 12/2020 | Brambilla et al. |
| 10,886,074 B2 | 1/2021 | Brambilla et al. |
| 11,088,556 B2 | 8/2021 | Cooley et al. |
| 11,127,537 B2 | 9/2021 | Brambilla et al. |
| 11,250,995 B2 | 2/2022 | Martini et al. |
| 11,250,996 B2 | 2/2022 | Brambilla et al. |
| 11,270,850 B2 | 3/2022 | Brambilla et al. |
| 2002/0027305 A1 | 3/2002 | Kibi et al. |
| 2004/0157121 A1* | 8/2004 | Watanabe ............ H01M 2/0426 |
| | | 429/185 |
| 2004/0214078 A1 | 10/2004 | Mitani et al. |
| 2004/0214081 A1 | 10/2004 | Nobuta et al. |
| 2004/0229117 A1 | 11/2004 | Mitani et al. |
| 2004/0233613 A1 | 11/2004 | Kasahara et al. |
| 2005/0064289 A1 | 3/2005 | Suzuki et al. |
| 2005/0204527 A1 | 9/2005 | Hinoki et al. |
| 2005/0214647 A1 | 9/2005 | Tanaka et al. |
| 2005/0221981 A1 | 10/2005 | Wagh et al. |
| 2005/0241137 A1 | 11/2005 | Suzuki et al. |
| 2005/0250010 A1 | 11/2005 | Kurihara et al. |
| 2005/0285080 A1 | 12/2005 | Suzuki et al. |
| 2006/0038304 A1* | 2/2006 | Osako ..................... H01L 24/29 |
| | | 257/789 |
| 2006/0040177 A1 | 2/2006 | Onodera et al. |
| 2006/0068284 A1 | 3/2006 | Takahashi et al. |
| 2006/0110538 A1* | 5/2006 | Yokoi ....................... H01G 9/08 |
| | | 427/306 |
| 2006/0141356 A1 | 6/2006 | Takahashi et al. |
| 2006/0166094 A1 | 7/2006 | Suzuki |
| 2006/0172134 A1* | 8/2006 | Ro ............................. C23C 8/20 |
| | | 428/408 |
| 2006/0175006 A1 | 8/2006 | Takahashi |
| 2006/0183022 A1 | 8/2006 | Takahashi et al. |
| 2007/0003836 A1 | 1/2007 | Suzuki et al. |
| 2007/0020385 A1 | 1/2007 | Naoi et al. |
| 2007/0025062 A1 | 2/2007 | Miyaki et al. |
| 2007/0122711 A1 | 5/2007 | Takahashi et al. |
| 2007/0148335 A1 | 6/2007 | Tanaka et al. |
| 2008/0014504 A1 | 1/2008 | Schneuwly |
| 2008/0089012 A1* | 4/2008 | Kon ........................ H01G 11/24 |
| | | 361/502 |
| 2008/0206639 A1 | 8/2008 | Kurihara |
| 2008/0226985 A1 | 9/2008 | Nobuta et al. |
| 2008/0241696 A1 | 10/2008 | Hinoki et al. |
| 2008/0286645 A1 | 11/2008 | Nobuta et al. |
| 2009/0011330 A1* | 1/2009 | Onodera ................ H01G 9/016 |
| | | 429/179 |
| 2009/0166192 A1 | 7/2009 | Ohashi et al. |
| 2009/0169979 A1 | 7/2009 | Ohashi et al. |
| 2009/0200509 A1 | 8/2009 | Suzuki et al. |
| 2009/0272946 A1 | 11/2009 | Lu |
| 2010/0055565 A1 | 3/2010 | Naoi et al. |
| 2010/0188800 A1* | 7/2010 | Ashizaki ................ H01G 9/016 |
| | | 361/502 |
| 2010/0233545 A1 | 9/2010 | Sano et al. |
| 2011/0128673 A1* | 6/2011 | Lee ........................ H01G 9/016 |
| | | 361/502 |
| 2011/0129710 A1 | 6/2011 | Ohashi et al. |
| 2012/0018191 A1 | 1/2012 | Yoshida et al. |
| 2012/0044614 A1 | 2/2012 | Hommo et al. |
| 2012/0045685 A1 | 2/2012 | Seki et al. |
| 2012/0134075 A1 | 5/2012 | Kawai |
| 2012/0141863 A1 | 6/2012 | Hagiwara |
| 2012/0217056 A1 | 8/2012 | Horikawa |
| 2013/0108917 A1 | 5/2013 | Kawai et al. |
| 2013/0122350 A1 | 5/2013 | Hagiwara et al. |
| 2013/0157121 A1 | 6/2013 | Tamachi et al. |
| 2013/0183575 A1 | 7/2013 | Goto et al. |

(56) References Cited

U.S. PATENT DOCUMENTS

| | | |
|---|---|---|
| 2013/0202951 A1 | 8/2013 | Kawai et al. |
| 2013/0271066 A1 | 10/2013 | Signorelli et al. |
| 2013/0280569 A1 | 10/2013 | Mori et al. |
| 2013/0280599 A1 | 10/2013 | Matsumoto et al. |
| 2013/0294012 A1 | 11/2013 | Mano et al. |
| 2013/0330637 A1 | 12/2013 | Matsumoto et al. |
| 2014/0036413 A1 | 2/2014 | Hagiwara et al. |
| 2014/0042988 A1 | 2/2014 | Kuttipillai |
| 2014/0057164 A1 | 2/2014 | Brambilla et al. |
| 2014/0072883 A1 | 3/2014 | Kondo et al. |
| 2014/0087243 A1 | 3/2014 | Onodera et al. |
| 2014/0087244 A1 | 3/2014 | Onodera et al. |
| 2014/0177135 A1 | 6/2014 | Mano et al. |
| 2014/0178718 A1 | 6/2014 | Kano |
| 2014/0234697 A1 | 8/2014 | Itoh |
| 2015/0002987 A1 | 1/2015 | Signorelli et al. |
| 2015/0056501 A1 | 2/2015 | Ihara et al. |
| 2015/0096744 A1 | 4/2015 | Signorelli et al. |
| 2015/0155540 A1 | 6/2015 | Mano et al. |
| 2015/0200416 A1 | 7/2015 | Ajima |
| 2015/0210548 A1 | 7/2015 | Brambilla et al. |
| 2015/0218913 A1 | 8/2015 | Cooley et al. |
| 2015/0279578 A1 | 10/2015 | Martini et al. |
| 2015/0287961 A1 | 10/2015 | Signorelli et al. |
| 2015/0380175 A1 | 12/2015 | Rawal et al. |
| 2016/0133894 A1 | 5/2016 | Onodera et al. |
| 2016/0204492 A1 | 7/2016 | Jiang et al. |
| 2016/0260552 A1 | 9/2016 | Sato et al. |
| 2016/0372799 A1 | 12/2016 | Watanabe et al. |
| 2016/0378085 A1 | 12/2016 | Guo et al. |
| 2017/0011862 A1 | 1/2017 | Tsuzuki et al. |
| 2017/0104216 A1 | 4/2017 | Nagase et al. |
| 2017/0110713 A1 | 4/2017 | Otsuka |
| 2017/0130337 A1 | 5/2017 | Yoshida et al. |
| 2017/0162908 A1 | 6/2017 | Nakayama et al. |
| 2017/0200970 A1 | 7/2017 | Tamachi et al. |
| 2017/0207491 A1 | 7/2017 | Tamachi et al. |
| 2017/0236656 A1 | 8/2017 | Kano et al. |
| 2017/0256367 A1 | 9/2017 | Raman et al. |
| 2017/0256782 A1 | 9/2017 | Raman et al. |
| 2017/0256816 A1 | 9/2017 | Watanabe et al. |
| 2017/0256821 A1 | 9/2017 | Suzuki et al. |
| 2017/0278642 A1 | 9/2017 | Nagase et al. |
| 2017/0288275 A1 | 10/2017 | Yokoshima et al. |
| 2017/0316889 A1 | 11/2017 | Martini et al. |
| 2017/0338054 A1 | 11/2017 | Knopsnyder et al. |
| 2017/0338055 A1 | 11/2017 | Knopsnyder et al. |
| 2017/0338059 A1 | 11/2017 | Knopsnyder et al. |
| 2017/0338061 A1 | 11/2017 | Knopsnyder et al. |
| 2017/0338483 A1 | 11/2017 | Nakayama et al. |
| 2017/0338669 A1 | 11/2017 | Hansen |
| 2017/0352855 A1 | 12/2017 | Tsuchiya et al. |
| 2017/0352866 A1 | 12/2017 | Kawai |
| 2017/0365420 A1 | 12/2017 | Horikawa et al. |
| 2018/0006284 A1 | 1/2018 | Tsuchiya et al. |
| 2018/0006310 A1 | 1/2018 | Kawai |
| 2018/0025852 A1 | 1/2018 | Aoki et al. |
| 2018/0047960 A1 | 2/2018 | Yokoshima et al. |
| 2018/0062135 A1 | 3/2018 | Nagashima et al. |
| 2018/0062155 A1 | 3/2018 | Mitchell et al. |
| 2018/0068803 A1 | 3/2018 | Brambilla et al. |
| 2018/0068804 A1 | 3/2018 | Brambilla et al. |
| 2018/0108494 A1 | 4/2018 | Takahashi et al. |
| 2018/0108495 A1 | 4/2018 | Nishishita et al. |
| 2018/0138552 A1 | 5/2018 | Matsumoto et al. |
| 2018/0145284 A1 | 5/2018 | Watanabe et al. |
| 2018/0158623 A1 | 6/2018 | Kishi |
| 2018/0174765 A1 | 6/2018 | Kano et al. |
| 2018/0190440 A1 | 7/2018 | Horikawa et al. |
| 2018/0219252 A1 | 8/2018 | Itaya et al. |
| 2018/0226686 A1 | 8/2018 | Tanaka et al. |
| 2018/0233300 A1 | 8/2018 | Horikawa |
| 2018/0233301 A1 | 8/2018 | Kano et al. |
| 2018/0248168 A1 | 8/2018 | Yokoshima et al. |
| 2018/0254448 A1 | 9/2018 | Aya |
| 2018/0286597 A1 | 10/2018 | Kawai et al. |
| 2018/0286600 A1 | 10/2018 | Kawai et al. |
| 2018/0287202 A1 | 10/2018 | Matsushita et al. |
| 2018/0294446 A1 | 10/2018 | Kimura |
| 2018/0211794 A1 | 11/2018 | Brambilla |
| 2018/0315982 A1 | 11/2018 | Daidoji et al. |
| 2018/0342358 A9 | 11/2018 | Brambilla |
| 2018/0375066 A1 | 12/2018 | Shibata |
| 2019/0006123 A1 | 1/2019 | Higuchi |
| 2019/0006698 A1 | 1/2019 | Kawai et al. |
| 2019/0080854 A9 | 3/2019 | Brambilla |
| 2019/0218894 A9 | 7/2019 | Signorelli et al. |
| 2019/0371534 A1 | 12/2019 | Brambilla et al. |
| 2020/0095847 A1 | 3/2020 | Signorelli et al. |
| 2020/0227211 A1 | 7/2020 | Brambilla et al. |
| 2020/0273632 A1 | 8/2020 | Signorelli et al. |
| 2021/0071514 A1 | 3/2021 | Cooley et al. |
| 2021/0159024 A1 | 5/2021 | Brambilla et al. |
| 2021/0327655 A1 | 10/2021 | Brambilla |
| 2021/0376641 A1 | 12/2021 | Cooley et al. |
| 2022/0044881 A1 | 2/2022 | Brambilla et al. |
| 2022/0223353 A1 | 7/2022 | Martini et al. |
| 2022/0243586 A1 | 8/2022 | Cooley et al. |
| 2022/0246364 A1 | 8/2022 | Brambilla |
| 2022/0254575 A1 | 8/2022 | Brambilla et al. |

FOREIGN PATENT DOCUMENTS

| | | |
|---|---|---|
| CN | 100492747 | 5/2009 |
| CN | 101859651 | 10/2010 |
| CN | 102376458 | 3/2012 |
| CN | 102426935 | 4/2012 |
| CN | 102568832 | 7/2012 |
| CN | 102842699 | 12/2012 |
| CN | 104134552 | 11/2014 |
| CN | 104769692 | 7/2015 |
| EP | 1619731 | 1/2006 |
| EP | 1796116 | 6/2007 |
| EP | 2077591 | 7/2009 |
| EP | 2357044 | 10/2011 |
| EP | 2495796 | 9/2012 |
| JP | 04075313 A * | 3/1992 |
| JP | H0475313 A | 3/1992 |
| JP | 2006100478 | 4/2006 |
| JP | 2007214391 A * | 8/2007 |
| JP | 2009234788 A * | 10/2009 |
| JP | 4694826 | 6/2011 |
| JP | 4694855 | 6/2011 |
| JP | 4773133 | 9/2011 |
| JP | 4824279 | 11/2011 |
| JP | 4845388 | 12/2011 |
| JP | 4865219 | 2/2012 |
| JP | 4950417 | 6/2012 |
| JP | 4965809 | 7/2012 |
| JP | 5032636 | 9/2012 |
| JP | 5044814 | 10/2012 |
| JP | 5108740 | 12/2012 |
| JP | 5111682 | 1/2013 |
| JP | 5155488 | 3/2013 |
| JP | 5181153 | 4/2013 |
| JP | 5276207 | 8/2013 |
| JP | 5294410 | 9/2013 |
| JP | 5311600 | 10/2013 |
| JP | 5341960 | 11/2013 |
| JP | 2013251421 | 12/2013 |
| JP | 2014022436 | 2/2014 |
| JP | 2014027161 | 2/2014 |
| JP | 2014041996 | 3/2014 |
| JP | 5466065 | 4/2014 |
| JP | 5495452 | 5/2014 |
| JP | 5588539 | 9/2014 |
| JP | 5605831 | 10/2014 |
| JP | 2014195051 | 10/2014 |
| JP | 2014195052 | 10/2014 |
| JP | 2014195053 | 10/2014 |
| JP | 5618324 | 11/2014 |
| JP | 5677600 | 2/2015 |
| JP | 5689352 | 3/2015 |
| JP | 5697472 | 4/2015 |

(56) References Cited

FOREIGN PATENT DOCUMENTS

| | | |
|---|---|---|
| JP | 5705569 | 4/2015 |
| JP | 2015099930 | 5/2015 |
| JP | 2015103474 | 6/2015 |
| JP | 2015103737 | 6/2015 |
| JP | 2015103738 | 6/2015 |
| JP | 2015103739 | 6/2015 |
| JP | 5742503 | 7/2015 |
| JP | 2015153847 | 8/2015 |
| JP | 5779387 | 9/2015 |
| JP | 2015162294 | 9/2015 |
| JP | 2015170762 | 9/2015 |
| JP | 5806024 | 11/2015 |
| JP | 5808955 | 11/2015 |
| JP | 5813821 | 11/2015 |
| JP | 5818069 | 11/2015 |
| JP | 2015193233 | 11/2015 |
| JP | 2015198109 | 11/2015 |
| JP | 2015211181 | 11/2015 |
| JP | 5828503 | 12/2015 |
| JP | 5875129 | 3/2016 |
| JP | 5905731 | 4/2016 |
| JP | 5909340 | 4/2016 |
| JP | 5909387 | 4/2016 |
| JP | 2016058583 | 4/2016 |
| JP | 5923272 | 5/2016 |
| JP | 2017028275 | 2/2017 |
| JP | 2015106517 | 6/2018 |
| KR | 100577906 | 5/2006 |
| KR | 100577907 | 5/2006 |
| KR | 100577908 | 5/2006 |
| KR | 101030406 | 4/2011 |
| KR | 20110049526 | 8/2011 |
| KR | 20130001145 | 1/2013 |
| KR | 101535829 | 7/2015 |
| KR | 20180054546 | 5/2018 |
| TW | 201416317 | 5/2014 |
| WO | WO2005064632 | 7/2005 |
| WO | WO2006098229 | 9/2006 |
| WO | WO2007037508 | 4/2007 |
| WO | WO2007130059 | 11/2007 |
| WO | WO2008049037 | 4/2008 |
| WO | WO2008049040 | 4/2008 |
| WO | WO2008093219 | 8/2008 |
| WO | WO2009152239 | 12/2009 |
| WO | WO2010092944 | 8/2010 |
| WO | WO2011070918 | 6/2011 |
| WO | WO2012002359 | 1/2012 |
| WO | WO2012011361 | 1/2012 |
| WO | WO2012112481 | 8/2012 |
| WO | WO2012160965 | 11/2012 |
| WO | WO2013002058 | 1/2013 |
| WO | WO2013002119 | 1/2013 |
| WO | WO2013190893 | 12/2013 |
| WO | WO2014091856 | 6/2014 |
| WO | WO2014196230 | 12/2014 |
| WO | WO2015122420 | 8/2015 |
| WO | WO2015133340 | 9/2015 |
| WO | WO2015157324 | 10/2015 |
| WO | WO2016057983 | 4/2016 |
| WO | WO2016121416 | 8/2016 |
| WO | WO2016147466 | 9/2016 |
| WO | WO2017057691 | 4/2017 |
| WO | WO2017094545 | 6/2017 |
| WO | WO2017098995 | 6/2017 |
| WO | WO2017111168 | 6/2017 |
| WO | WO2017135437 | 8/2017 |
| WO | WO2017154312 | 9/2017 |
| WO | WO2017154313 | 9/2017 |
| WO | WO2017158701 | 9/2017 |
| WO | WO2017158702 | 9/2017 |
| WO | WO2017158703 | 9/2017 |
| WO | WO2017158704 | 9/2017 |
| WO | WO2017169843 | 10/2017 |
| WO | WO2017200086 | 11/2017 |
| WO | WO2017208508 | 12/2017 |
| WO | WO2017208509 | 12/2017 |
| WO | WO2017208510 | 12/2017 |
| WO | WO2017208511 | 12/2017 |
| WO | WO2017208512 | 12/2017 |
| WO | WO2018016653 | 1/2018 |
| WO | WO2018016654 | 1/2018 |
| WO | WO2018020811 | 2/2018 |
| WO | WO2018055875 | 3/2018 |
| WO | WO2018055960 | 3/2018 |
| WO | WO2018066549 | 4/2018 |
| WO | WO2018079817 | 5/2018 |
| WO | WO2018139135 | 8/2018 |
| WO | WO2018154831 | 8/2018 |
| WO | WO2018155468 | 8/2018 |
| WO | WO2018173787 | 9/2018 |
| WO | WO2018179653 | 10/2018 |

OTHER PUBLICATIONS

PCT Search Report for International Application No. PCT/US2017/061947 dated Mar. 14, 2018, 4 pages.
PCT Written Opinion for International Application No. PCT/US2017/061947 dated Mar. 14, 2018, 8 pages.

* cited by examiner

ULTRACAPACITOR FOR USE IN A SOLDER REFLOW PROCESS

CROSS REFERENCE TO RELATED APPLICATION

The present application claims filing benefit of U.S. Provisional Patent Application Ser. No. 62/425,636 having a filing date of Nov. 23, 2016, and which is incorporated herein by reference in its entirety.

BACKGROUND OF THE INVENTION

Electrical energy storage cells are widely used to provide power to electronic, electromechanical, electrochemical, and other useful devices. An electric double layer ultracapacitor, for instance, generally employs a pair of polarizable electrodes that contain carbon particles (e.g., activated carbon) impregnated with a liquid electrolyte. Due to the effective surface area of the particles and the small spacing between the electrodes, large capacitance values may be achieved. Nevertheless, problems remain. For instance, it is often desirable to attach capacitors to a circuit board using a "solder reflow" process during which a solder paste is used to temporarily attach the capacitor and then heated to a relatively high peak temperature (e.g., about 150° C. or more) to melt the solder paste and connect the capacitor to the board. Unfortunately, however, most conventional ultracapacitors are highly sensitive to temperature and thus cannot be readily employed in solder reflow processes.

As such, a need currently exists for an improved ultracapacitor that can operate at high temperatures and still maintain stable electrical properties.

SUMMARY OF THE INVENTION

In accordance with one embodiment of the present invention, an ultracapacitor is disclosed that comprises a housing having sidewalls extending in a direction generally perpendicular to a base to define an upper end. An interior cavity is defined between an inner surface of the base and the sidewalls. First and second conductive members are disposed on the inner surface of the base, and first and second external terminations are disposed on an outer surface of the base and electrically connected to the first and second conductive members, respectively. An electrode assembly is positioned within the interior cavity that contains first and second leads extending outwardly therefrom. The first and second leads are electrically connected to the first and second conductive members, respectively. A nonaqueous electrolyte is in ionic contact with the electrode assembly, and a lid is disposed on the upper end of the sidewalls to seal the electrode assembly and the electrolyte within the housing.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figure in which.

Figure 1:
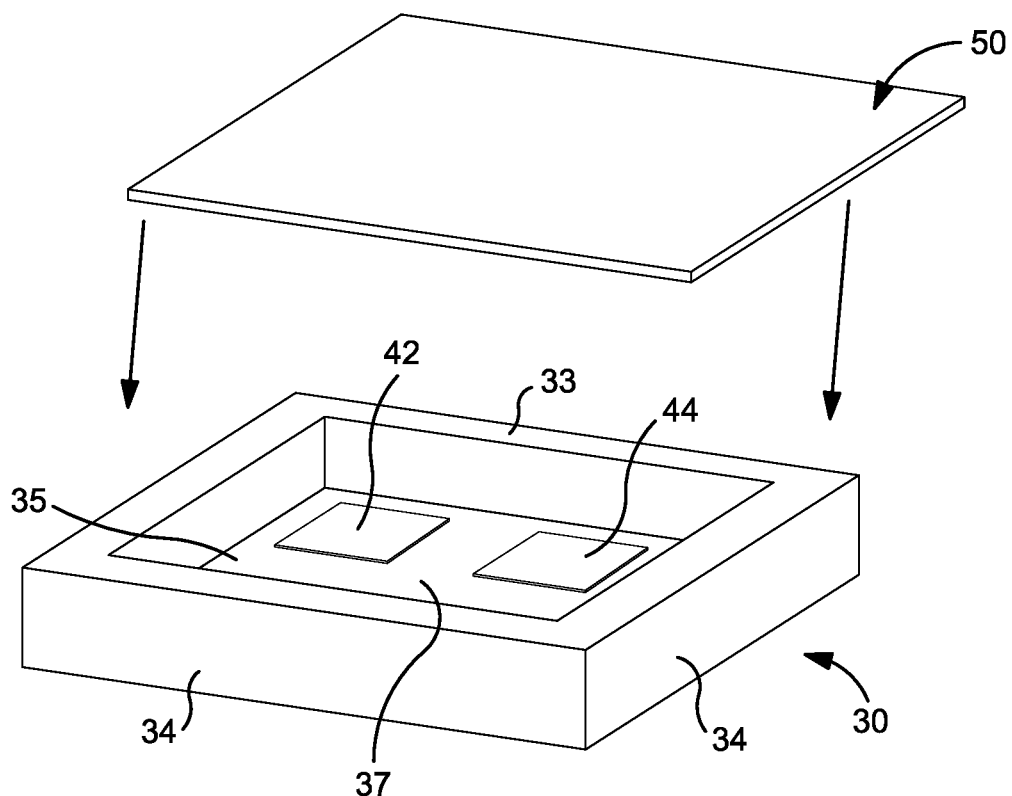
FIG. 1 is a top perspective view of one embodiment of a housing and lid that may be employed in the ultracapacitor of the present invention.

Repeat use of reference characters in the present specification and drawing is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed an ultracapacitor that is capable of exhibiting good properties even after being subjected to high temperatures, such as experienced during solder reflow. The ultracapacitor contains a housing having sidewalls that extend in a direction generally perpendicular to a base. An interior cavity is defined between an inner surface of the base and the sidewalls within which an electrode assembly can be positioned. The ultracapacitor also contains a lid that is disposed on an upper end of the sidewalls to seal the electrode assembly within the housing. To attach the electrode assembly to the housing, first and second conductive members are disposed on the inner surface of the base. The electrode assembly likewise contains first and second leads that extend outwardly therefrom and are electrically connected to the first and second conductive members, respectively. The first and second conductive members are, in turn, electrically connected to first and second external terminations, respectively, which are provided on an outer surface of the base. By selectively controlling the manner in which the electrode assembly is attached and retained within the housing, the present inventors have discovered that a variety of beneficial properties may be achieved. That is, the resulting ultracapacitor may exhibit excellent electrical properties even when exposed to high temperatures, such as about 150° C. or more, in some embodiments about 200° C. or more, and in some embodiments, from about 200° C. to about 350° C. For example, the ultracapacitor may be subjected to a "solder reflow" process in which it is placed into contact with a solder paste and then heated to a peak temperature of from about 150° C. or more, in some embodiments about 200° C. or more, and in some embodiments, from about 200° C. to about 350° C. to melt the paste and connect the ultracapacitor to a circuit board (e.g., printed circuit board).

Even after being exposed to such a high temperature, the ultracapacitor may remain dimensionally stable and may also retain good electrical properties. For example, the capacitor may be about 6 Farads per cubic centimeter ("F/cm$^3$") or more, in some embodiments about 8 F/cm$^3$ or more, in some embodiments from about 9 to about 100 F/cm$^3$, and in some embodiments, from about 10 to about 80 F/cm$^3$, measured at a frequency of 120 Hz and without an applied voltage. The capacitance may be measured using a Keithley 3330 Precision LCZ meter with a DC bias of 0.0 volts, 1.1 volts, or 2.1 volts (0.5 volt peak to peak sinusoidal signal). The operating frequency is 120 Hz. A variety of temperature and relative humidity levels may be tested. For example, the temperature may be 200° C. and the relative humidity may be 25% or 85%. The capacitance can remain stable at such temperatures for a substantial period of time, such as for about 100 hours or more, in some embodiments from about 300 hours to about 5000 hours, and in some embodiments, from about 600 hours to about 4500 hours (e.g., 168, 336, 504, 672, 840, 1008, 1512, 2040, 3024, or 4032 hours). The ultracapacitor may also have a low equivalence series resistance ("ESR"), such as about 150 mohms or less, in some embodiments less than about 125 mohms, in some embodiments from about 0.01 to about 100 mohms, and in some embodiments, from about 0.05 to about 70 mohms, determined at a frequency of 1 kHz and without an applied voltage. The ESR can also remain stable at such temperatures for a substantial period of time, such as noted above. Equivalence series resistance may be measured using a Keithley 3330 Precision LCZ meter with a DC bias of 0.0 volts, 1.1 volts, or 2.1 volts (0.5 volt peak to peak sinusoidal signal). The operating frequency is 1 kHz. A variety of temperature and relative humidity levels may be tested. For example, the temperature may be 200° C. and the relative humidity may be 25% or 85%.

Various embodiments of the present invention will now be described in more detail.

I. Housing

Figure 2:
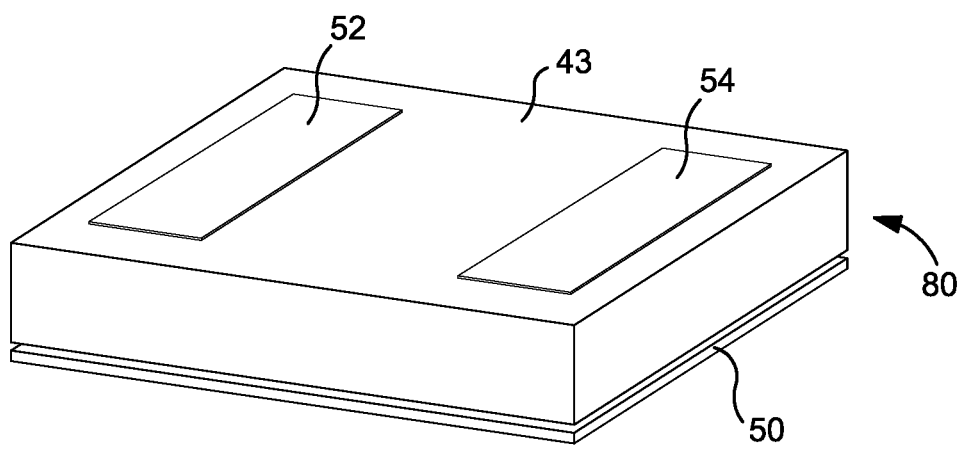
FIG. 2 is a bottom perspective view of one embodiment of the ultracapacitor of the present invention.
Figure 3:
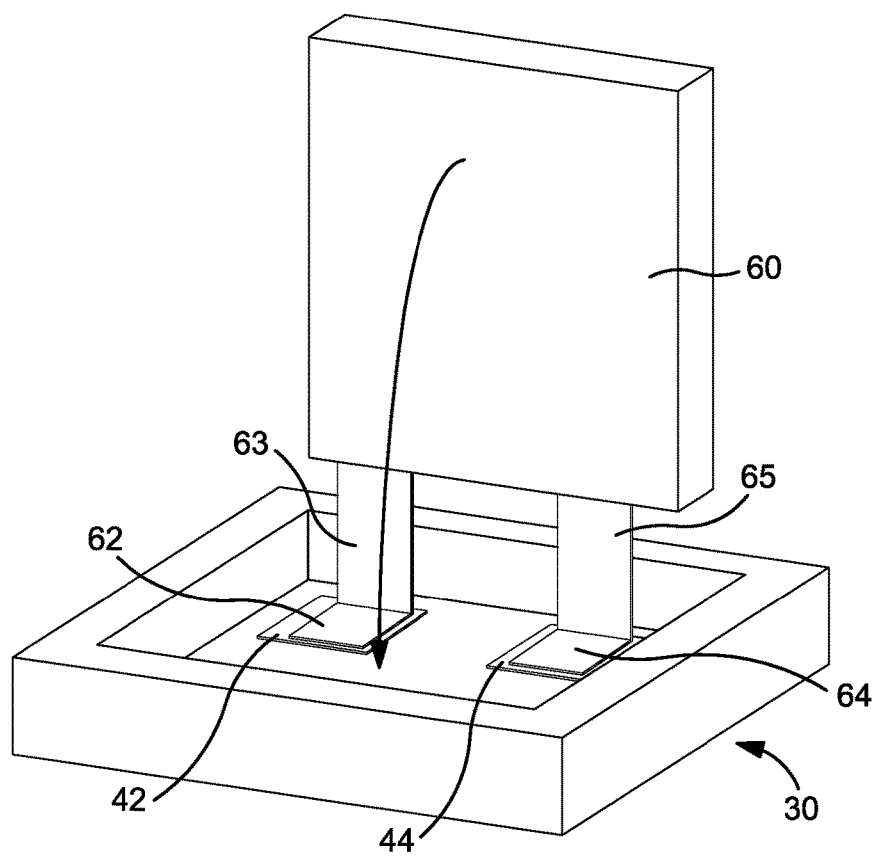
FIG. 3 shows one embodiment for connecting an electrode assembly to the housing of FIG. 1.

As indicated above, the ultracapacitor of the present invention employs a housing within which an electrode assembly is retained and sealed. Referring to FIGS. 1-3, for instance, one embodiment of an ultracapacitor 80 is shown that contains a housing 30. As shown, the housing 30 contains sidewalls 34 that extend in a direction generally perpendicular to a base 37 to define an upper end 33. The base 37 likewise defines an inner surface 35 and an outer surface 43. Any of a variety of different materials may be used to form the sidewalls 34 and base 37, such as metals, plastics, ceramics, and so forth. In one embodiment, for example, the sidewalls and/or base may include one or more layers of a ceramic material, such as aluminum nitride, aluminum oxide, silicon oxide, magnesium oxide, calcium oxide, glass, etc., as well as combinations thereof. In other embodiments, the sidewalls and/or base may include one or more layers of a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth.

As indicated above, first and second conductive members are also employed within the interior cavity of the housing to facilitate the connection of the electrode assembly in a mechanically stable manner. For example, referring again to FIGS. 1-3, a first conductive member 42 and a second conductive member 44 are disposed on the inner surface 35 of the base 37 and extend in a plane that is generally parallel to the base 37. The conductive members 42 and 44 may be provided in any form (e.g., pad, plate, frame, etc.), but generally have a relatively small thickness or to minimize the thickness of the resulting ultracapacitor. For instance, the thickness of the conductive members may range from about 0.05 to about 1 millimeter, in some embodiments from about 0.05 to about 0.5 millimeters, and from about 0.1 to about 0.2 millimeters. The conductive members are typically formed from one or more layers of a metal, such as nickel, silver, gold, tin, copper, etc.

As shown in FIG. 3, the electrode assembly 60 contains a first lead 62 that is electrically connected to a first electrode (not shown) and a second lead 64 that is electrically connected to a second electrode (not shown). The leads 62 and 64 extend outwardly from a front end of the electrode assembly 60 and are electrically connected to the first and second conductive members 42 and 44, respectively. Generally speaking, the leads 62 and 64 are attached to the conductive members 42 and 44 in a manner such that both the leads and the conductive members are provided in a plane that is generally parallel to the base 37. When attached in this manner, however, portions 63 and 65 of the leads may remain extended from the front end of the electrode assembly 60 in a direction perpendicular to the base 37 so that a major surface of the electrode assembly 60 is positioned generally perpendicular to the base 37. In such configurations, the leads 62 and 64 may thus be folded downwardly as shown by the directional arrow so that the electrode assembly 60 can be retained within the housing 30 and positioned with its major surface generally parallel to the base 37. Of course, it should be understood that this is by no means required. In other embodiments, for example, the leads may be provided on a bottom surface of the electrode assembly so that it may be simply stacked onto the conductive members 42 and 44.

In any event, attachment of the electrode assembly 60 to the conductive members may generally be accomplished using any of a variety of known techniques, such as welding, laser welding, conductive adhesives, etc. In one particular embodiment, for example, the leads 62 and 64 are connected to the conductive members 42 and 44, respectively, with a conductive adhesive. The conductive adhesive may be formed from conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives are described in U.S. Patent Application Publication No. 2006/0038304 to Osako, et al.

The first and second conductive members 42 and 44 are electrically connected to first and second external terminations 52 and 54 (FIG. 2), respectively, which are provided on the outer surface 43 of the base 37 and extend in a plane that is generally parallel to the base 37. The terminations 52 and 54 may be provided in any form (e.g., pad, plate, frame, etc.), but generally have a relatively small thickness or to minimize the thickness of the resulting ultracapacitor and improve its ability to be surface mounted to a circuit board. For instance, the thickness of the terminations may range from about 0.05 to about 1 millimeter, in some embodiments from about 0.05 to about 0.5 millimeters, and from about 0.1 to about 0.2 millimeters. The terminations are typically formed from one or more layers of a metal, such as nickel, silver, gold, tin, copper, etc. If desired, the surface of the terminations may be electroplated with nickel, silver, gold, tin, etc. as is known in the art to ensure that the final part is mountable to the circuit board. In one particular embodiment, the termination(s) are deposited with nickel and silver flashes, respectively, and the mounting surface is also plated with a tin solder layer. In another embodiment, the termination(s) are deposited with thin outer metal layers (e.g., gold) onto a base metal layer (e.g., copper alloy) to further increase conductivity.

Regardless of the manner in which they are formed, the first and second external terminations 52 and 54 are electrically connected to the first and second conductive members 42 and 44, respectively, to provide the desired connection with the electrode assembly. In one embodiment, for instance, the conductive members 42 and 44 may simply extend through the base 37 to form the external terminations 52 and 54. Alternatively, a separate conductive trace (not shown) may be attached to the first conductive member 42 that extends through the base 37 and either forms the first external termination 52 or is connected to an additional conductive member that serves as the external termination 52. Similarly, the second conductive member 44 may extend through the base 37 to form the external termination 54, or a separate conductive trace (not shown) may be attached to the second conductive member 44 that extends through the base 37 and either forms the termination 54 or is connected to an additional conductive member that serves as the termination 54. When traces are employed, a via (not shown) may be formed within the base 37 to accommodate the trace.

The manner in which they conductive members and external terminations are electrically connected may vary as is known in the art. In certain embodiments, for example, welding techniques may be employed, such as ultrasonic welding, laser welding, resistance welding, etc. In yet other embodiments, a conductive adhesive may be employed to connect the conductive members to respective terminations.

When employed, the conductive adhesive typically contains a plurality of particles that are formed from an electrically conductive material (e.g., metal). Examples of suitable conductive materials include, for instance, metals, such as nickel, copper, gold, silver, silver coated copper, silver coated nickel, etc., carbon materials, such as graphite, nickel coated carbon, etc.; and so forth. The conductive adhesive also generally contains a resinous material within which the conductive particles are dispersed. Although any resinous material may be employed, it is generally desired to use a resin that is a curable thermosetting resin, such as an epoxy resin, melamine resin, maleimide resin, polyimide resin, phenolic resin, etc. Epoxy resins are particularly suitable. Examples of suitable epoxy resins include, for instance, glycidyl ether type epoxy resins, such as bisphenol A type epoxy resins, bisphenol F type epoxy resins, phenol novolac type epoxy resins, orthocresol novolac type epoxy resins, brominated epoxy resins and biphenyl type epoxy resins, cyclic aliphatic epoxy resins, glycidyl ester type epoxy resins, glycidylamine type epoxy resins, cresol novolac type epoxy resins, naphthalene type epoxy resins, phenol aralkyl type epoxy resins, cyclopentadiene type epoxy resins, heterocyclic epoxy resins, etc. Still other suitable conductive adhesive resins may also be described in U.S. Patent Application Publication No. 2006/0038304 to Osako, et al. and U.S. Pat. No. 7,554,793 to Chacko. Typically, the resinous material constitutes from about 0.5 wt. % to about 50 wt. %, in some embodiments from about 1 wt. % to about 25 wt. %, and in some embodiments, from about 2 wt. % to about 20 wt. % of the dry weight of the adhesive. Likewise, the conductive particles typically constitute from about 50 wt. % to about 99.5 wt. %, in some embodiments from about 75 wt. % to about 99 wt. %, and in some embodiments, from about 80 wt. % to about 98 wt. % of the adhesive, on a dry basis. The adhesive may be applied using known techniques, such as screen-printing, dipping, electrophoretic coating, electron beam deposition, spraying, roller pressing, brushing, doctor blade casting, vacuum deposition, coating, etc. Regardless, once applied, the conductive adhesive may be cured as using any of a variety of known techniques, such as heat curing, actinic radiation curing (e.g., ultraviolet radiation, e-beam radiation, infrared radiation, etc.), and so forth.

Once connected in the desired manner, the electrode assembly may then be sealed within the housing. Referring again to FIG. 1, for instance, the ultracapacitor 80 may also include a lid 50 that is positioned on the upper end 33 of the sidewalls 34 after the electrode assembly is 60 positioned within the housing 30. The lid 50 may be formed from a ceramic, metal (e.g., iron, copper, nickel, cobalt, etc., as well as alloys thereof), plastic, and so forth. If desired, a sealing member (not shown) may be disposed between the lid 50 and the sidewalls 34 to help provide a good seal. In one embodiment, for example, the sealing member may include a glass-to-metal seal, Kovar® ring (Goodfellow Camridge, Ltd.), etc. The height of the sidewalls 34 is generally such that the lid 50 does not contact any surface of the electrode assembly 60. When placed in the desired position, the lid 50 may be sealed to the sidewalls 34 using known techniques, such as welding (e.g., resistance welding, laser welding, etc.), soldering, etc.

II. Electrode Assembly

As indicated above, the electrode assembly contains first and second leads that are electrically connected to first and second electrodes, respectively. The first electrode typically includes a first electrode containing a first carbonaceous coating (e.g., activated carbon particles) electrically coupled to a first current collector, and a second electrode containing a second carbonaceous coating (e.g., activated carbon particles) electrically coupled to a second current collector. A separator may also be positioned between the first electrode and the second electrode. Various embodiments of such an assembly are described in more detail below.

A. Electrodes

As indicated above, the first and second electrodes typically contain first and second current collectors, respectively. It should be understood that additional current collectors may also be employed if desired, particularly if the ultracapacitor includes multiple energy storage cells. The current collectors may be formed from the same or different materials. Regardless, each collector is typically formed from a substrate that includes a conductive metal, such as aluminum, stainless steel, nickel, silver, palladium, etc., as well as alloys thereof. Aluminum and aluminum alloys are particularly suitable for use in the present invention. The substrate may be in the form of a foil, sheet, plate, mesh, etc. The substrate may also have a relatively small thickness, such as about 200 micrometers or less, in some embodiments from about 1 to about 100 micrometers, in some embodiments from about 5 to about 80 micrometers, and in some embodiments, from about 10 to about 50 micrometers. Although by no means required, the surface of the substrate may be optionally roughened, such as by washing, etching, blasting, etc.

Figure 4:
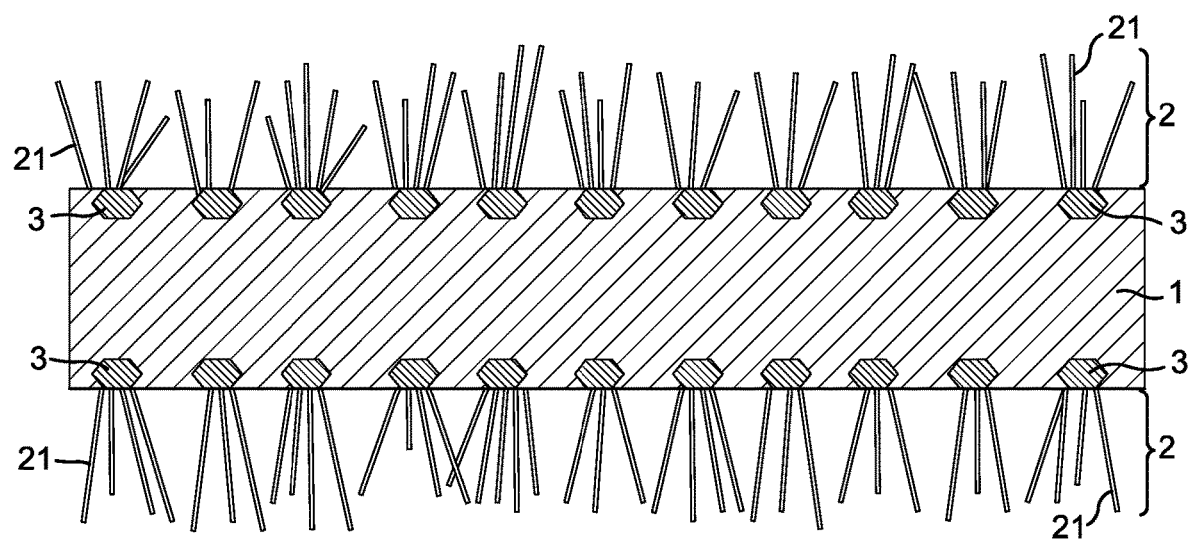
FIG. 4 is a schematic view of one embodiment of a current collector that may be employed in the ultracapacitor of the present invention.

In certain embodiments, at least one of the first and second current collectors, and preferably both, also contain a plurality of fiber-like whiskers that project outwardly from the substrate. Without intending to be limited by theory, it is believed that these whiskers can effectively increase the surface area of the current collector and also improve the adhesion of the current collector to the corresponding electrode. This can allow for the use of a relatively low binder content in the first electrode and/or second electrode, which can improve charge transfer and reduce interfacial resistance and consequently result in very low ESR values. The whiskers are typically formed from a material that contains carbon and/or a reaction product of carbon and the conductive metal. In one embodiment, for example, the material may contain a carbide of the conductive metal, such as aluminum carbide ($Al_4C_3$). Referring to FIG. 4, for instance, one embodiment of a current collector is shown that contains a plurality of whiskers 21 projecting outwardly from a substrate 1. If desired, the whiskers 21 may optionally project from a seed portion 3 that is embedded within the substrate 1. Similar to the whiskers 21, the seed portion 3 may also be formed from a material that contains carbon and/or a reaction product of carbon and the conductive metal, such as a carbide of the conductive metal (e.g., aluminum carbide).

The manner in which such whiskers are formed on the substrate may vary as desired. In one embodiment, for instance, the conductive metal of the substrate is reacted with a hydrocarbon compound. Examples of such hydrocarbon compounds may include, for instance, paraffin hydrocarbon compounds, such as methane, ethane, propane, n-butane, isobutane, pentane, etc.; olefin hydrocarbon compounds, such as ethylene, propylene, butene, butadiene, etc.; acetylene hydrocarbon compounds, such as acetylene; as well as derivatives or combinations of any of the foregoing. It is generally desired that the hydrocarbon compounds are in a gaseous form during the reaction. Thus, it may be desired to employ hydrocarbon compounds, such as methane, ethane, and propane, which are in a gaseous form when heated. Although not necessarily required, the hydrocarbon compounds are typically employed in a range of from about 0.1 parts to about 50 parts by weight, and in some embodiments, from about 0.5 parts by weight to about 30 parts by weight, based on 100 parts by weight of the substrate. To initiate the reaction with the hydrocarbon and conductive metal, the substrate is generally heated in an atmosphere that is at a temperature of about 300° C. or more, in some embodiments about 400° C. or more, and in some embodiments, from about 500° C. to about 650° C. The time of heating depends on the exact temperature selected, but typically ranges from about 1 hour to about 100 hours. The atmosphere typically contains a relatively low amount of oxygen to minimize the formation of a dielectric film on the surface of the substrate. For example, the oxygen content of the atmosphere may be about 1% by volume or less.

Figure 5:
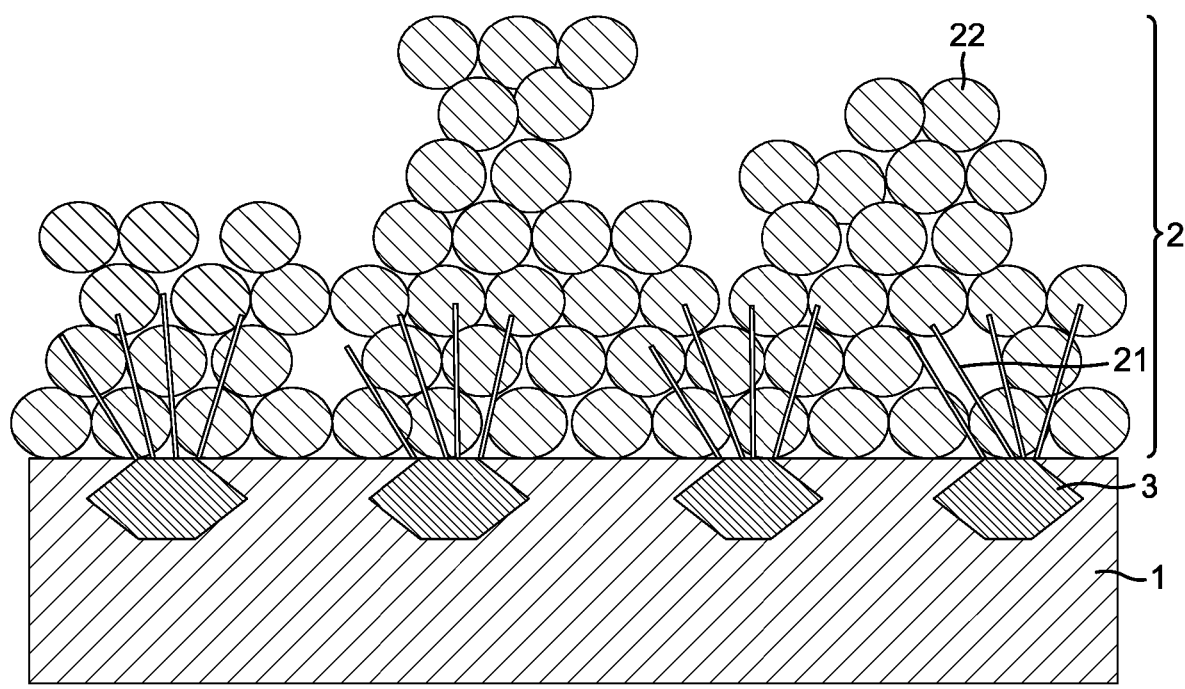
FIG. 5 is a schematic view of one embodiment of a current collector/carbonaceous coating configuration that may be employed in the ultracapacitor of the present invention.

The ultracapacitor may also contain first and second carbonaceous coatings that are electrically coupled to the first and second current collectors, respectively. While they may be formed from the same or different types of materials and may contain one or multiple layers, each of the carbonaceous coatings generally contains at least one layer that includes activated particles. In certain embodiments, for instance, the activated carbon layer may be directly positioned over the current collector and may optionally be the only layer of the carbonaceous coating. Referring to FIG. 5, for example, an activated carbon layer 21 may be disposed on the current collector. Examples of suitable activated carbon particles may include, for instance, coconut shell-based activated carbon, petroleum coke-based activated carbon, pitch-based activated carbon, polyvinylidene chloride-based activated carbon, phenolic resin-based activated carbon, polyacrylonitrile-based activated carbon, and activated carbon from natural sources such as coal, charcoal or other natural organic sources.

In certain embodiments, it may be desired to selectively control certain aspects of the activated carbon particles, such as their particle size distribution, surface area, and pore size distribution to help improve ion mobility for certain types of electrolytes after being subjected to one or more charge-discharge cycles. For example, at least 50% by volume of the particles (D50 size) may have a size in the range of from about 0.01 to about 30 micrometers, in some embodiments from about 0.1 to about 20 micrometers, and in some embodiments, from about 0.5 to about 10 micrometers. At least 90% by volume of the particles (D90 size) may likewise have a size in the range of from about 2 to about 40 micrometers, in some embodiments from about 5 to about 30 micrometers, and in some embodiments, from about 6 to about 15 micrometers. The BET surface may also range from about 900 $m^2/g$ to about 3,000 $m^2/g$, in some embodiments from about 1,000 $m^2/g$ to about 2,500 $m^2/g$, and in some embodiments, from about 1,100 $m^2/g$ to about 1,800 $m^2/g$.

In addition to having a certain size and surface area, the activated carbon particles may also contain pores having a certain size distribution. For example, the amount of pores less than about 2 nanometers in size (i.e., "micropores") may provide a pore volume of about 50 vol. % or less, in some embodiments about 30 vol. % or less, and in some embodiments, from 0.1 vol. % to 15 vol. % of the total pore volume. The amount of pores between about 2 nanometers and about 50 nanometers in size (i.e., "mesopores") may likewise be from about 20 vol. % to about 80 vol. %, in some embodiments from about 25 vol. % to about 75 vol. %, and in some embodiments, from about 35 vol. % to about 65 vol. %. Finally, the amount of pores greater than about 50 nanometers in size (i.e., "macropores") may be from about 1 vol. % to about 50 vol. %, in some embodiments from about 5 vol. % to about 40 vol. %, and in some embodiments, from about 10 vol. % to about 35 vol. %. The total pore volume of the carbon particles may be in the range of from about 0.2 $cm^3/g$ to about 1.5 $cm^3/g$, and in some embodiments, from about 0.4 $cm^3/g$ to about 1.0 $cm^3/g$, and the median pore width may be about 8 nanometers or less, in some embodiments from about 1 to about 5 nanometers, and in some embodiments, from about 2 to about 4 nanometers. The pore sizes and total pore volume may be measured using nitrogen adsorption and analyzed by the Barrett-Joyner-Halenda ("BJH") technique as is well known in the art.

As discussed above, one unique aspect of the present invention is that the electrodes need not contain a substantial amount of binders conventionally employed in ultracapacitor electrodes. That is, binders may be present in an amount of about 60 parts or less, in some embodiments 40 parts or less, and in some embodiments, from about 1 to about 25 parts per 100 parts of carbon in the first and/or second carbonaceous coatings. Binders may, for example, constitute about 15 wt. % or less, in some embodiments about 10 wt. % or less, and in some embodiments, from about 0.5 wt. % to about 5 wt. % of the total weight of a carbonaceous coating. Nevertheless, when employed, any of a variety of suitable binders can be used in the electrodes. For instance, water-insoluble organic binders may be employed in certain embodiments, such as styrene-butadiene copolymers, polyvinyl acetate homopolymers, vinyl-acetate ethylene copolymers, vinyl-acetate acrylic copolymers, ethylene-vinyl chloride copolymers, ethylene-vinyl chloride-vinyl acetate terpolymers, acrylic polyvinyl chloride polymers, acrylic polymers, nitrile polymers, fluoropolymers such as polytetrafluoroethylene or polyvinylidene fluoride, polyolefins, etc., as well as mixtures thereof. Water-soluble organic binders may also be employed, such as polysaccharides and derivatives thereof. In one particular embodiment, the polysaccharide may be a nonionic cellulosic ether, such as alkyl cellulose ethers (e.g., methyl cellulose and ethyl cellulose); hydroxyalkyl cellulose ethers (e.g., hydroxyethyl cellulose, hydroxypropyl cellulose, hydroxypropyl hydroxybutyl cellulose, hydroxyethyl hydroxypropyl cellulose, hydroxyethyl hydroxybutyl cellulose, hydroxyethyl hydroxypropyl hydroxybutyl cellulose, etc.); alkyl hydroxyalkyl cellulose ethers (e.g., methyl hydroxyethyl cellulose, methyl hydroxypropyl cellulose, ethyl hydroxyethyl cellulose, ethyl hydroxypropyl cellulose, methyl ethyl hydroxyethyl cellulose and methyl ethyl hydroxypropyl cellulose); carboxyalkyl cellulose ethers (e.g., carboxymethyl cellulose); and so forth, as well as protonated salts of any of the foregoing, such as sodium carboxymethyl cellulose.

If desired, other materials may also be employed within an activated carbon layer of the first and/or second carbonaceous coatings and/or within other layers of the first and/or second carbonaceous coatings. For example, in certain embodiments, a conductivity promoter may be employed to further increase electrical conductivity. Exemplary conductivity promoters may include, for instance, carbon black, graphite (natural or artificial), graphite, carbon nanotubes, nanowires or nanotubes, metal fibers, graphenes, etc., as well as mixtures thereof. Carbon black is particularly suitable. When employed, conductivity promoters typically constitute about 60 parts or less, in some embodiments 40 parts or less, and in some embodiments, from about 1 to about 25 parts per 100 parts of the activated carbon particles in a carbonaceous coating. Conductivity promotes may, for example, constitute about 15 wt. % or less, in some embodiments about 10 wt. % or less, and in some embodiments, from about 0.5 wt. % to about 5 wt. % of the total weight of a carbonaceous coating. Activated carbon particles likewise typically constitute 85 wt. % or more, in some embodiments about 90 wt. % or more, and in some embodiments, from about 95 wt. % to about 99.5 wt. % of a carbonaceous coating.

The particular manner in which a carbonaceous coating is applied to a current collector may vary as is well known to those skilled in the art, such as printing (e.g., rotogravure), spraying, slot-die coating, drop-coating, dip-coating, etc. Regardless of the manner in which it is applied, the resulting electrode is typically dried to remove moisture from the coating, such as at a temperature of about 100° C. or more, in some embodiments about 200° C. or more, and in some embodiments, from about 300° C. to about 500° C. The electrode may also be compressed (e.g., calendered) to optimize the volumetric efficiency of the ultracapacitor. After any optional compression, the thickness of each carbonaceous coating may generally vary based on the desired electrical performance and operating range of the ultracapacitor. Typically, however, the thickness of a coating is from about 20 to about 200 micrometers, 30 to about 150 micrometers, and in some embodiments, from about 40 to about 100 micrometers. Coatings may be present on one or both sides of a current collector. Regardless, the thickness of the overall electrode (including the current collector and the carbonaceous coating(s) after optional compression) is typically within a range of from about 20 to about 350 micrometers, in some embodiments from about 30 to about 300 micrometers, and in some embodiments, from about 50 to about 250 micrometers.

B. Separator

The electrode assembly may also contain a separator that is positioned between the first and second electrodes. If desired, other separators may also be employed in the ultracapacitor of the present invention. For example, one or more separators may be positioned over the first electrode, the second electrode, or both. The separators enable electrical isolation of one electrode from another to help prevent an electrical short, but still allow transport of ions between the two electrodes. In certain embodiments, for example, a separator may be employed that includes a cellulosic fibrous material (e.g., airlaid paper web, wet-laid paper web, etc.), nonwoven fibrous material (e.g., polyolefin nonwoven webs), woven fabrics, film (e.g., polyolefin film), etc. Cellulosic fibrous materials are particularly suitable for use in the ultracapacitor, such as those containing natural fibers, synthetic fibers, etc. Specific examples of suitable cellulosic fibers for use in the separator may include, for instance, hardwood pulp fibers, softwood pulp fibers, rayon fibers, regenerated cellulosic fibers, etc. Regardless of the particular materials employed, the separator typically has a thickness of from about 5 to about 150 micrometers, in some embodiments from about 10 to about 100 micrometers, and in some embodiments, from about 20 to about 80 micrometers.

Figure 6:
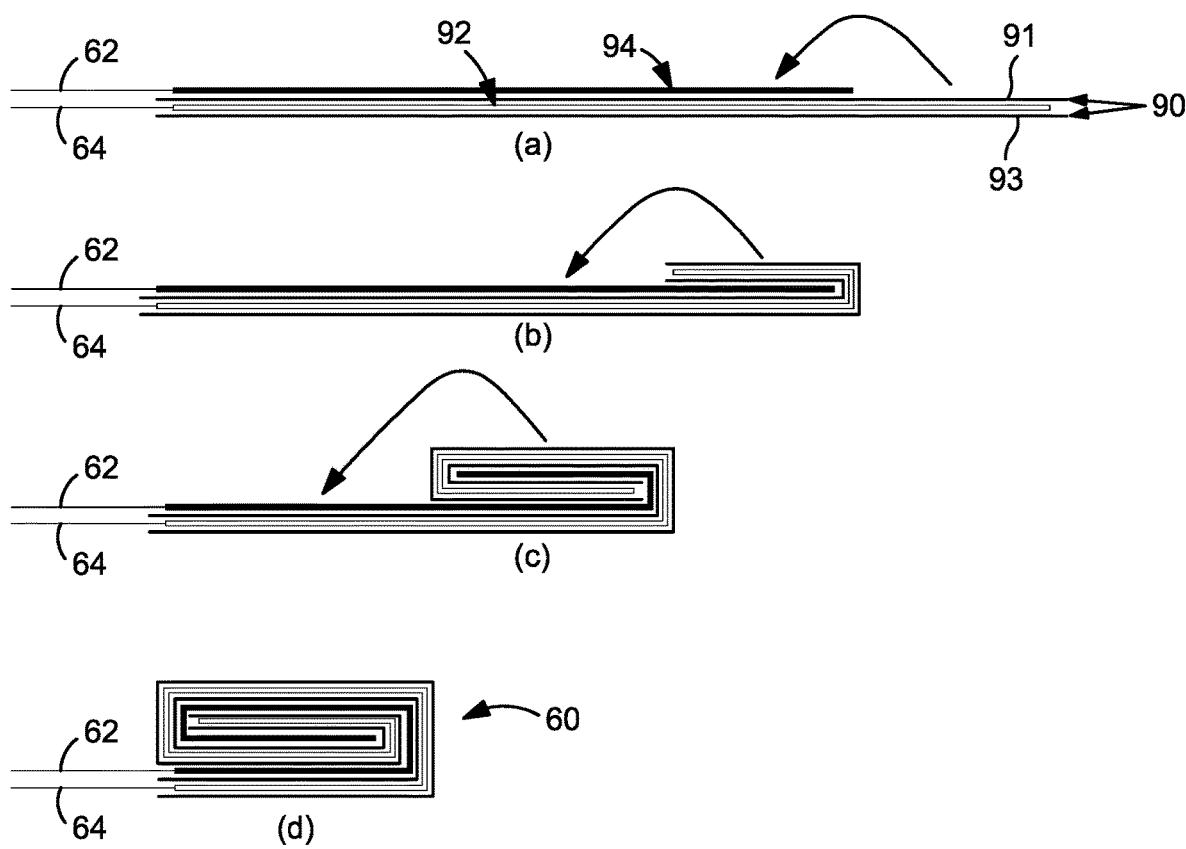
FIG. 6 is a schematic view illustrating one embodiment for forming an electrode assembly for use in the ultracapacitor of the present invention.

The manner in which these components are assembled into an electrode assembly may vary as is known in the art. For example, the electrodes and separator may be initially folded, wound, or otherwise contacted together to form an electrode assembly. In one particular embodiment, the electrodes are separator may be folded into an electrode assembly having a "jelly-roll" configuration. Referring to FIG. 6, for instance, one embodiment of such a jellyroll electrode assembly is shown that contains a first electrode 92, second electrode 94, and a first separator 91 positioned between the electrodes 92 and 94. In this particular embodiment, a second separator 93 is also positioned adjacent to the first electrode 90, although it should be understood that a single separator can also be used that simply envelopes the first electrode 90. Regardless, each of two coated surfaces of the electrodes is separated by a separator, thereby maximizing surface area per unit volume and capacitance. As shown in FIG. 6(a), the leads 62 and 64 extend outwardly from the electrodes 92 and 94 beyond edges of the separators 91 and 93. In addition to providing the leads for connection to the housing structure, this can also help prevent "shorting" due to the flow of electrical current between the electrodes. In any event, to form the electrode assembly, the electrodes and separators are folded together in such a manner that the leads remain exposed. In FIG. 6, for instance, three (3) separate folds are employed. Namely, FIG. 6(b) shows a first fold, FIG. 6(c) shows a second fold, and FIG. 6(c) shows a third fold, each of which are employed to achieve the final structure of the electrode assembly 60 as shown in FIG. 6(d). Of course, it should be understood that any number of folds may be used, such as 1 or more, in some embodiments 2 or more, and in some embodiments, 3 or more.

III. Electrolyte

To form an electrochemical cell, the ultracapacitor of the present invention also contains an electrolyte that is ionic contact with the electrode assembly. The electrolyte may be placed into contact with the electrode assembly in a variety of ways as is known in the art. In certain embodiments, for instance, the electrolyte may be placed into contact (e.g., immersed, coated, etc.) with the electrode assembly prior to its incorporation into the housing. In addition to or in lieu of pre-contact with the electrode assembly, the electrolyte may also be supplied to the interior cavity of the housing after the electrode assembly is provided therein. Regardless, the application of the electrolyte typically occurs before the lid is attached to the upper end of the sidewalls as discussed above.

The electrolyte is generally nonaqueous in nature and thus typically contains at least one nonaqueous solvent. To help extend the operating temperature range of the ultracapacitor, it is typically desired that the nonaqueous solvent have a relatively high boiling temperature, such as about 150° C. or more, in some embodiments about 200° C. or more, and in some embodiments, from about 220° C. to about 300° C. Particularly suitable high boiling point solvents may include, for instance, cyclic carbonate solvents, such as ethylene carbonate, propylene carbonate, butylene carbonate, vinylene carbonate, etc. Propylene carbonate is particularly suitable due to its high electric conductivity and decomposition voltage, as well as its ability to be used over a wide range of temperatures. Of course, other nonaqueous solvents may also be employed, either alone or in combination with a cyclic carbonate solvent. Examples of such solvents may include, for instance, open-chain carbonates (e.g., dimethyl carbonate, ethyl methyl carbonate, diethyl carbonate, etc.), aliphatic monocarboxylates (e.g., methyl acetate, methyl propionate, etc.), lactone solvents (e.g., butyrolactone valerolactone, etc.), nitriles (e.g., acetonitrile, glutaronitrile, adiponitrile, methoxyacetonitrile, 3-methoxypropionitrile, etc.), amides (e.g., N,N-dimethylformamide, N,N-diethylacetamide, N-methylpyrrolidinone), alkanes (e.g., nitromethane, nitroethane, etc.), sulfur compounds (e.g., sulfolane, dimethyl sulfoxide, etc.); and so forth.

The electrolyte may also contain at least one ionic liquid, which is dissolved in the nonaqueous solvent. While the concentration of the ionic liquid can vary, it is typically desired that the ionic liquid is present at a relatively high concentration. For example, the ionic liquid may be present in an amount of about 0.8 moles per liter (M) of the electrolyte or more, in some embodiments about 1.0 M or more, in some embodiments about 1.2 M or more, and in some embodiments, from about 1.3 to about 1.8 M.

The ionic liquid is generally a salt having a relatively low melting temperature, such as about 400° C. or less, in some embodiments about 350° C. or less, in some embodiments from about 1° C. to about 100° C., and in some embodiments, from about 5° C. to about 50° C. The salt contains a cationic species and counterion. The cationic species contains a compound having at least one heteroatom (e.g., nitrogen or phosphorous) as a "cationic center." Examples of such heteroatomic compounds include, for instance, unsubstituted or substituted organoquaternary ammonium compounds, such as ammonium (e.g., trimethylammonium, tetraethylammonium, etc.), pyridinium, pyridazinium, pyramidinium, pyrazinium, imidazolium, pyrazolium, oxazolium, triazolium, thiazolium, quinolinium, piperidinium, pyrrolidinium, quaternary ammonium spiro compounds in which two or more rings are connected together by a spiro atom (e.g., carbon, heteroatom, etc.), quaternary ammonium fused ring structures (e.g., quinolinium, isoquinolinium, etc.), and so forth. In one particular embodiment, for example, the cationic species may be an N-spirobicyclic compound, such as symmetrical or asymmetrical N-spirobicyclic compounds having cyclic rings. One example of such a compound has the following structure:

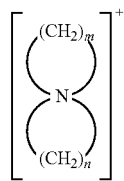

wherein m and n are independently a number from 3 to 7, and in some embodiments, from 4 to 5 (e.g., pyrrolidinium or piperidinium).

Suitable counterions for the cationic species may likewise include halogens (e.g., chloride, bromide, iodide, etc.); sulfates or sulfonates (e.g., methyl sulfate, ethyl sulfate, butyl sulfate, hexyl sulfate, octyl sulfate, hydrogen sulfate, methane sulfonate, dodecylbenzene sulfonate, dodecylsulfate, trifluoromethane sulfonate, heptadecafluorooctanesulfonate, sodium dodecylethoxysulfate, etc.); sulfosuccinates; amides (e.g., dicyanamide); imides (e.g., bis (pentafluoroethyl-sulfonyl)imide, bis (trifluoromethylsulfonyl)imide, bis(trifluoromethyl)imide, etc.); borates (e.g., tetrafluoroborate, tetracyanoborate, bis [oxalato]borate, bis[salicylato]borate, etc.); phosphates or phosphinates (e.g., hexafluorophosphate, diethylphosphate, bis(pentafluoroethyl)phosphinate, tris(pentafluoroethyl)-trifluorophosphate, tris(nonafluorobutyl)trifluorophosphate, etc.); antimonates (e.g., hexafluoroantimonate); alum inates (e.g., tetrachloroaluminate); fatty acid carboxylates (e.g., oleate, isostearate, pentadecafluorooctanoate, etc.); cyanates; acetates; and so forth, as well as combinations of any of the foregoing.

Several examples of suitable ionic liquids may include, for instance, spiro-(1,1')-bipyrrolidinium tetrafluoroborate, triethylmethyl ammonium tetrafluoroborate, tetraethyl ammonium tetrafluoroborate, spiro-(1,1')-bipyrrolidinium iodide, triethylmethyl ammonium iodide, tetraethyl ammonium iodide, methyltriethylammonium tetrafluoroborate, tetrabutylammonium tetrafluoroborate, tetraethylammonium hexafluorophosphate, etc.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. An ultracapacitor comprising:
a housing having sidewalls extending in a direction generally perpendicular to a base to define an upper end, wherein an interior cavity is defined between an inner surface of the base and the sidewalls, wherein the sidewalls and the base contain a ceramic material;
first and second conductive members disposed on the inner surface of the base;
first and second external terminations disposed on the outer surface of the base and electrically connected to the first and second conductive members, respectively;
a jellyroll electrode assembly positioned within the interior cavity and containing first and second leads extending outwardly therefrom, wherein the first and second leads are electrically connected to the first and second conductive members, respectively,
wherein the jellyroll electrode assembly contains a first electrode that comprises a first current collector electrically coupled to a first carbonaceous coating and a second electrode that comprises a second current collector electrically coupled to a second carbonaceous coating,
wherein the first carbonaceous coating, the second carbonaceous coating, or both contain activated carbon particles containing a plurality of pores,
wherein the amount of pores having a size of from about 2 nanometers to about 50 nanometers is about 20 vol. % to about 65 vol. % of the total pore volume and wherein the median pore width is 8 nanometers or less;

a nonaqueous electrolyte in ionic contact with the jellyroll electrode assembly; and a lid disposed on the upper end of the sidewalls to seal the jellyroll electrode assembly and the electrolyte within the housing wherein a sealing member is disposed between the lid and the sidewalls.

2. The ultracapacitor of claim 1, wherein the ceramic material comprises aluminum nitride, aluminum oxide, silicon oxide, magnesium oxide, calcium oxide, glass, or a combination thereof.

3. The ultracapacitor of claim 1, wherein each of the sidewalls and the base contains a polymeric material.

4. The ultracapacitor of claim 1, wherein the first and second conductive members extend in a plane that is generally parallel to the base.

5. The ultracapacitor of claim 1, wherein the first and second terminations extend in a plane that is generally parallel to the base.

6. The ultracapacitor of claim 1, wherein the conductive members and terminations contain a metal.

7. The ultracapacitor of claim 1, wherein the first and second leads extend from a front end of the jellyroll electrode assembly.

8. The ultracapacitor of claim 1, wherein a major surface of the jellyroll electrode assembly is positioned parallel to the base.

9. The ultracapacitor of claim 1, wherein a conductive trace is attached to the first conductive member and extends through the base and is attached to the first external termination, and further wherein a conductive trace is attached to the second conductive member and extends through the base and is attached to the second external termination.

10. The ultracapacitor of claim 1, wherein the first current collector and the second current collector each contain a substrate that includes a conductive metal.

11. The ultracapacitor of claim 10, wherein the conductive metal is aluminum or an alloy thereof.

12. The ultracapacitor of claim 10, wherein a plurality of fiber-like whiskers project outwardly from the substrate of the first current collector, the substrate of the second current collector, or both.

13. The ultracapacitor of claim 12, wherein the whiskers contain a carbide of the conductive metal.

14. The ultracapacitor of claim 10, wherein the jellyroll electrode assembly further contains a separator positioned between the first electrode and the second electrode.

15. The ultracapacitor of claim 14, wherein the first electrode, the second electrode, and the separator are folded into the jellyroll electrode assembly.

16. The ultracapacitor of claim 1, wherein the first carbonaceous coating and the second carbonaceous coating contain activated carbon particles.

17. The ultracapacitor of claim 1, wherein at least 50% by volume of the activated carbon particles have a size of from about 0.01 to about 30 micrometers.

18. The ultracapacitor of claim 1, wherein the amount of pores having a size of about 2 nanometers or less is about 50 vol. % or less of the total pore volume and the amount of pores having a size of about 50 nanometers or more is from about 1 vol. % to about 50 vol. % of the total pore volume.

19. The ultracapacitor of claim 1, wherein the nonaqueous electrolyte contains an ionic liquid that is dissolved in a nonaqueous solvent, wherein the ionic liquid contains a cationic species and a counterion.

20. The ultracapacitor of claim 19, wherein the nonaqueous solvent includes propylene carbonate.

21. The ultracapacitor of claim 19, wherein the cationic species includes an organoquaternary ammonium compound.

22. The ultracapacitor of clam 21, wherein the organoquaternary ammonium compound has the following structure:

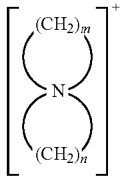

wherein m and n are independently a number from 3 to 7.

23. The ultracapacitor of claim 19, wherein the ionic liquid is present at a concentration of about 1.0 M or more.

24. The ultracapacitor of claim 1, wherein the first and second external terminations are electrically connected to the first and second conductive members, respectively, via a conductive adhesive.

25. The ultracapacitor of claim 24, wherein the conductive adhesive includes a plurality of metal particles dispersed within a resinous material.

26. The ultracapacitor of claim 25, wherein the resinous material is an epoxy resin.

27. A method for attaching the ultracapacitor of claim 1 to a circuit board, the method comprising placing the ultracapacitor and circuit board in contact with a solder paste and heating the solder paste to a peak temperature of about 150° C. or more.

28. The ultracapacitor of claim 1, wherein the ultracapacitor exhibits a capacitance of about 6 Farads per cubic centimeter or more.

29. The ultracapacitor of claim 1, wherein the first and second conductive members are electrically connected to the first and second external terminations, respectively, directly through the base.

* * * * *